Aug. 27, 1968  S. FROHLICH  3,398,638
VERTICAL CAMERA
Filed March 2, 1966
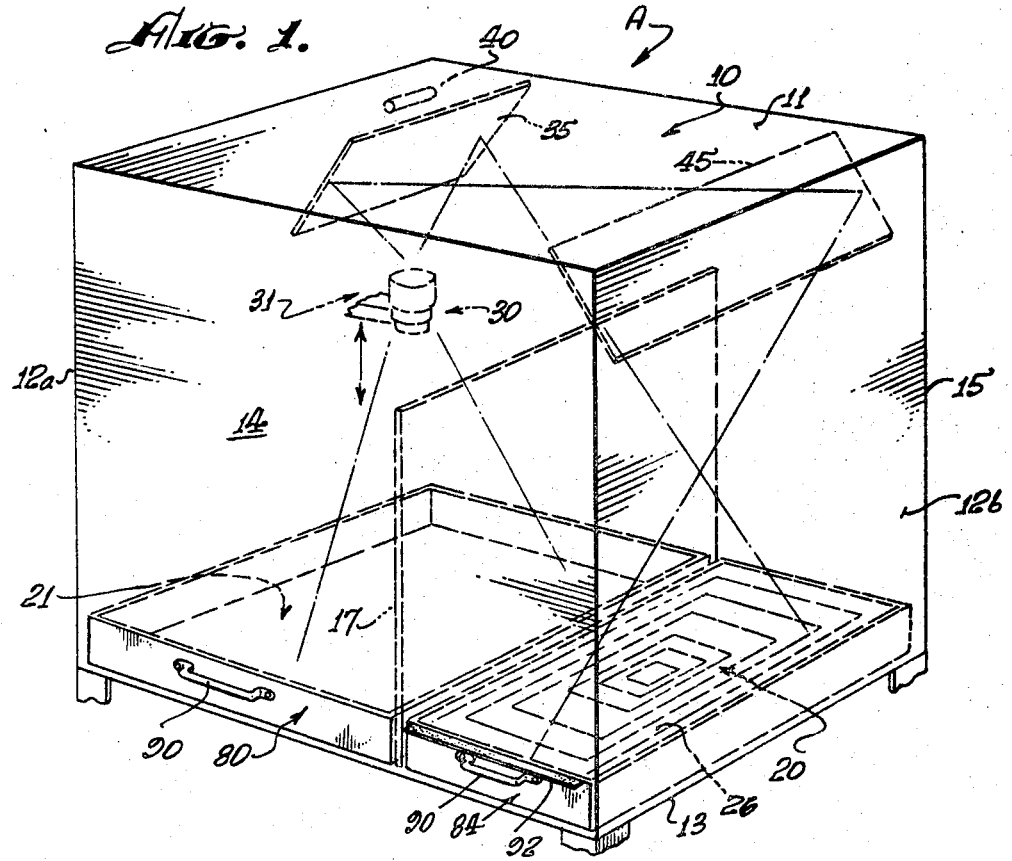
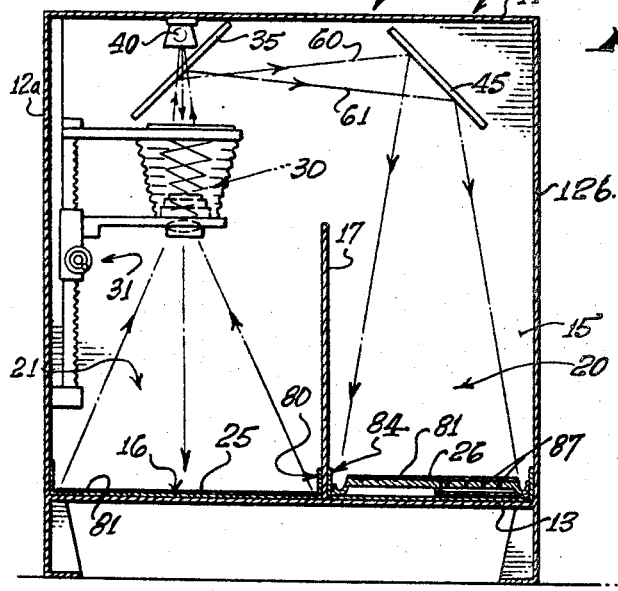
INVENTOR.
SIGURD FROHLICH,
By His Attorneys
Spensley & Horn

United States Patent Office 3,398,638
Patented Aug. 27, 1968

3,398,638
VERTICAL CAMERA
Sigurd Frohlich, 2154 San Marcos,
Claremont, Calif. 91711
Filed Mar. 2, 1966, Ser. No. 531,174
5 Claims. (Cl. 88—24)

This invention relates to a camera and, more particularly, to a camera having a novel apparatus for illumination and type-conversion.

The present invention was designed particularly as a graphic arts camera. However, as will be seen from the subsequent description, the invention has equal utility in other fields where photography or optical observation is required. For purposes of convenience, the invention herein will be described in connection with photography and, more particularly, in connection with a graphic arts camera.

The effects of lighting in photography are well known. It is readily observable that the appearance of an object or image to be photographed can be varied substantially by changing the lighting pattern employed. For example, subjects to be photographed may be rendered more or less sharp because of shadows and difraction effects caused by the lighting utilized. It is known in the art that in copying work distortion and lack of clarity results in large measure from the presence of penumbral shadows and diffraction effects resulting from the illumination means employed. For a long time improving lighting would not result in any particular advantage since lenses and films produced more distortion and lack of resolution than was caused by the lighting, that is, lenses and films were the limiting factors rather than the lighting. Today, however, new films with extremely high resolution capabilities have been developed. Also, refined antihalation backings have been developed for films. Further, the new computer-designed lenses have extremely high resolution capabilities and also have coated surfaces to eliminate internal reflections. Thus, lenses and film are no longer limiting factors and to improve the quality of photographic copying, the lighting techniques and apparatus must be improved.

For accurate reproduction in graphic arts photography, the light source typically used is a high-power mercury vapor lamp chosen for its high-power output and its color temperature which is particularly suited for color photography. Typically, a quartz iodine light source will be utilized; however, for fine screening work, a pin point light source is provided. In the prior art, the lamps are oriented obliquely with respect to the surface to be copied. This creates the penumbral shadows and diffraction effects mentioned above. This is particularly a problem when attempting to photograph type faces such as hot or cold metal type faces as the oblique shadows cast from the side lighting renders the type without contrast. Prior art lighting systems have been utilized where the light source encircles the lens. These sources reduce the amount of shadows cast, however, these systems also create diffraction and some shadow effects because they are not on the image line itself. Further, it is difficult to provide a light source of the mercury vapor type of high power in close proximity to the lens because of the size and heat generated by the lamp.

Accordingly, it is an object of this invention to provide a camera which photographs a color image with high fidelity.

Another object of this invention is to provide a camera which photographs a low contrast object with high fidelity and with good contrast.

Another object of this invention is to provide a camera that has an illumination means which does not cause shadows.

A further object of this invention is to provide a novel lighting apparatus for use in copy work.

Yet another object of this invention is to provide a camera for copy work that makes undistorted copies.

It is a further object of this invention to provide a camera and lighting apparatus that is compact and convenient to use.

Yet another object of this invention is to provide a camera in which the film may be handled conveniently without the necessity of a darkroom.

Another object of this invention is to provide a camera and lighting apparatus wherein the light covers the same field as does the camera lens.

Another object of this invention is to provide a graphic arts camera which is relatively inexpensive to manufacture.

The problems of the prior art are overcome by the invention herein disclosed. The invention comprises generally a camera having a housing divided by a baffle into two sections. One section contains the film and the other section the copy which is to be photographed. Located above the copy is a zoom lens for providing variable enlargements of the copy. Above the lens at an oblique angle to the lens axis is a partially silvered mirror. A light source is provided behind the mirror in axial alignment with the lens. Thus, light directed through the partially silvered mirror passes though the lens to the copy and is reflected back through the lens and to the partially silvered mirror and off the partially silvered mirror at an oblique angle to the direction of light coming through the lens. Above the film is provided another mirror oriented with respect to the film so that it will receive the light reflected from the partially silvered mirror and direct such light to the film. Thus, the present invention provides a lighting system which directs the light along the axis of the lens and which thus eliminates the exact same field that the lens covers. It is obvious, since the light is transmitted through the lens itself, that no distortion or shadow or diffraction effects are created by the light source.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIG. 1 is a semischematic view of a new type graphic arts camera constructed in accordance with this invention; and, FIG. 2 is a side view partly in section of the invention as shown in FIG. 1.

Referring to the drawing, FIG. 1 shows a preferred embodiment of a graphic arts camera constructed in accordance with the invention. The camera is designated by the general reference character A. The camera A has a generally rectangular housing 10 having a top 11, two end walls 12a and 12b, a bottom 13, a front wall 14, and a rear wall 15. An internal retainer 16 is provided within the housing. The retainer 16 is parallel to bottom 13 and spaced above it by an amount sufficient to accommodate film and copy drawers as will be discussed hereinafter. Mounted to retainer 16 is a vertical baffle 17 which divides the housing into two general sections, a film section 20 and a copy section 21. The baffle 17 is parallel to end walls 12. The drawing of copy 25 is located in copy section 21. The film 26 of the camera is placed in the film section 20. Centrally located over copy 25 is zoom lens 30. The zoom lens 30 is affixed by adjustment means 31 to end walls 12a. The adjustment means 31 serves to raise and lower the zoom lens 30 over copy 25. The adjustment means 31 may be of any of several well-known types, such as rack and pinion or worm and gear and the like. The zoom lens 30 is of the kind well known in the lens art and has therein a system of movable elements such that as the lens 30 is adjusted in height by adjustment means 31 the image of copy 25 as focused by the lens 30 remains in focus in the film plane. Located above the lens is a partially silvered mirror 35. Mirror 35 is of the kind well known in the art as a 2-way mirror, that is, it is only partially silvered such that if viewing from a bright area through the mirror to a dim area, the light reflected in the direction of viewing is greater than the light transmitted in the direction of viewing and, therefore, the viewer sees a reflection of objects in the bright area. On the other hand, if viewing from a dim area into a bright area, the amount of light transmitted in the viewing direction is greater than the amount of light reflected and the viewer, therefore, sees through the mirror and, thus, sees objects in the bright area. The shape of mirror 35 is unimportant and it is merely necessary that the area of mirror 35 be great enough in extent to cover the image of the copy 25 that the lens 30 places upon mirror 35. Mirror 35 is oriented at a 45° angle to the axis of lens 30 and is placed so that light reflected from the mirror 35 will be directed perpendicular to the end wall 12b proximate film 25. A light source 40 is located above mirror 35 and is arranged coaxially with lens 30. Although any light source may be utilized, a mercury vapor lamp is particularly suitable because of the high powers available from fairly small lamps and because, as stated hereinabove, the color temperature of the output of such lamps is particularly advantageous for color work. A front surface mirror 45 is located above film 26. Mirror 45 is oriented symmetrically with respect to mirror 35 so that light reflecting from mirror 35 will be received by mirror 45 and reflected to the film 26. As with mirror 35, the shape of mirror 45 is not important. It is only necessary that mirror 45 have an area of sufficient extent to receive the entire image that is reflected from mirror 35. The height of baffle 17 is not critical. The baffle is utilized merely to prevent light reflection occurring in the copy area from impinging in the film area. Thus, baffle 17 extends in height to a point which will not interface with transmission of the copy image from mirror 35 to mirror 45. All internal surfaces in the housing are painted or otherwise made with a matte black finish to eliminate internal reflection.

In operation, the light source 40 transmits light through mirror 35 through the lens 30 and onto copy 25. As discussed hereinabove, the light, since it is coming through the lens 30, occupies precisely the same field as does the image that will be focused by the lens. Thus, the light is not side light as in the prior art but rather is light transmitted along the light axis and, thus, diffraction effects and shadow effects do not occur. Light is then reflected from the copy 25 back through lens 30 and to mirror 35. Since mirror 35 is only partially silvered, some of the light thus reflected returns to the source 40. Some of the light indicated by lines 60 and 61 is reflected from mirror 35 to mirror 45 and therefrom to the film 26. The zoom lens 30 is adjusted by adjustment means 31 to provide the desired enlargement or reduction from the copy 25 to the film 26. Thus, this invention with its unique lighting method provides a camera that produces sharp clear photographs without the deteriorating shadow and diffraction effects encountered in devices of the prior art.

In the preferred embodiment of this invention, a novel copy and film handling system is provided which eliminates the necessity of a darkroom. A copy drawer 80 is fitted below retainer 16. When fully inserted into the camera, the top surface 81 of the drawer covers the full copy area, that is, the area extending from the end wall 12a to baffle 17 and from wall 14 to wall 15. A similar film drawer 84 is provided which when fully inserted covers the entire film area, that is, the area extending from end wall 12b to baffle 17 and from wall 14 to wall 15. Each of the drawers 80 and 84 are closed at the tops thereof, that is, the tops of the drawers present flat surfaces at the approximate level of retainer 16 for placing the film 26 and the copy 25. The drawers 80 and 84 are provided with handles 90 for convenience in withdrawing and reinserting the drawers in use. The upper surface of drawer 84 is provided with a number of distributed ports 87 which are connected to a vacuum chamber, that is, a chamber which is connected to a vacuum pump such that when a film is placed on the surface 81 the ports will be covered, thus creating a vacuum chamber. The chamber is then evacuated by the pump and the differential pressure thereby created holds the film rigidly flat on the surface of drawer 84. Film is supplied from the manufacturer with a light protective paper cover. Thus, for insertion of film into the camera, it is only necessary to withdraw drawer 84 to place the covered film on top of surface 81 then the drawer is inserted into the film chamber. For use the protective cover 92 is slipped off of the film which is held in place by the vacuum. Similarly, the copy 25 is placed in the camera by withdrawing drawer 80, placing the copy on the top surface thereof, and reinserting the drawer. A typical vacuum film support system is described in detail in U.S. Patent No. 2,895,706, filed Feb. 14, 1955. It is readily understood from this film handling system that no darkroom is required for the use of this camera. Thus, the camera, because of this unique film handling system and because of the folded optical structure resulting from the use of mirrors 35 and 46, is considerably more compact than prior art cameras and may be utilized in a small area of a photographic laboratory. This is of particular advantage for type-conversion work and newspaper work because space is typically at a premium and further the fervor of activity often makes a darkroom unsuitable because of the communication difficulties attendant to darkroom use.

The camera is particularly suitable for the photography of type faces because since the lighting is directed along the lens axis substantially no diffraction effect or shadow effects take place at the edges of the type and, thus, extremely sharp reproductions are achieved. For example, in the letterpress gravure and newspaper printing fields, metal type is set by hand or hot metal type is set by equipment well known in the art such as "Monotype" or "Linotype" typesetting machines. After the type is set a proof sheet is made on paper by inking the type and imprinting the paper. Since a certain amount of ink will spread through the paper fiber during the "proofing," the proof will be substantially less sharp than the type face. Typically, proofs are 50–60 percent less sharp than the type face. The proof is then copied by a camera. Thus, it is obvious that the invention described herein solves this problem since by use of a camera constructed in accordance with this invention, the photograph is made directly from the type face and the "proof" step is eliminated.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:
1. A camera comprising:
 (a) a housing;
 (b) baffle means for dividing said housing into copy and film sections;
 (c) means for handling copy in said copy section and means for handling film in said film section;
 (d) said film handling means adapted to receive a sheet of film and thereby define a film plane;

(e) said copy handling means adapted to receive a copy and thereby define a copy plane;
(f) a lens, said lens adapted to focus an image from said copy plane;
(g) a light source adapted to direct light coaxially through said lens to said copy plane;
(h) a first mirror interposed between said lens and said light source, the surface of said first mirror being oriented obliquely to the axis of said lens, said first mirror being partially silvered; and,
(i) a second mirror, said second mirror being adapted to receive light reflected from said first mirror and to direct said reflected light to said film plane.

2. A camera as defined in claim 1, wherein said first mirror is adapted to receive light reflected from said copy plane and adapted to transmit some of said light to said light source and to reflect some of said light to said second mirror.

3. A camera as defined in claim 2, wherein said film handling means is vacuum operated.

4. A camera as defined in claim 3, wherein said lens is a zoom lens.

5. A camera as defined in claim 4, wherein said film handling means comprises a drawer having a film positioning surface, said surface defining therein vacuum ports.

References Cited
UNITED STATES PATENTS

| | | | |
|---|---|---|---|
| 2,081,329 | 5/1937 | Gordon | 88—24 |
| 2,804,800 | 9/1957 | Stevens | 88—26 XR |
| 2,895,706 | 7/1959 | Blatherwick | 88—24 XR |
| 2,930,284 | 3/1960 | Limberger | 88—24 |
| 3,149,546 | 9/1964 | Schulze | 88—24 XR |

NORTON ANSHER, *Primary Examiner.*
FRED L. BRAUN, *Assistant Examiner.*